(12) United States Patent
Boyde et al.

(10) Patent No.: US 10,287,969 B2
(45) Date of Patent: May 14, 2019

(54) INTERNAL COMBUSTION ENGINE AND METHOD FOR OPERATING AN INTERNAL COMBUSTION ENGINE

(71) Applicant: MTU FRIEDRICHSHAFEN GMBH, Friedrichshafen (DE)

(72) Inventors: Jan Boyde, Friedrichshafen (DE); Philippe Gorse, Friedrichshafen (DE); Jan Gerrit Prunnbauer, Lindau (DE); Joachim Schwarte, Langenargen (DE)

(73) Assignee: MTU FRIEDRICHSHAFFEN GMBH, Friedrichshafen (DE)

( * ) Notice: Subject to any disclaimer, the term of this patent is extended or adjusted under 35 U.S.C. 154(b) by 0 days.

(21) Appl. No.: 15/563,431

(22) PCT Filed: Mar. 22, 2016

(86) PCT No.: PCT/EP2016/000494
§ 371 (c)(1),
(2) Date: Sep. 29, 2017

(87) PCT Pub. No.: WO2016/155870
PCT Pub. Date: Oct. 6, 2016

(65) Prior Publication Data
US 2018/0066571 A1    Mar. 8, 2018

(30) Foreign Application Priority Data

Apr. 2, 2015    (DE) .................. 10 2015 206 074

(51) Int. Cl.
*F02B 19/10* (2006.01)
*F02M 21/02* (2006.01)
(Continued)

(52) U.S. Cl.
CPC .......... *F02B 19/1085* (2013.01); *F02B 19/10* (2013.01); *F02B 19/1023* (2013.01);
(Continued)

(58) Field of Classification Search
CPC ...... F02B 19/10; F02B 19/1023; F02B 19/12; F02D 19/0647; F02D 41/0027; F02M 21/02
(Continued)

(56) References Cited

U.S. PATENT DOCUMENTS 4,638,777 A *  1/1987  Fanner ................ F02B 19/1019
                                                        123/277
4,903,656 A *  2/1990  Nakazono ........... F02B 19/1014
                                                        123/253
(Continued)

FOREIGN PATENT DOCUMENTS

WO        9308399 A1     4/1993
WO     2014147978 A1     9/2014

*Primary Examiner* — Erick R Solis
(74) *Attorney, Agent, or Firm* — Lucas & Mercanti, LLP; Klaus P. Stoffel (57) ABSTRACT

An internal combustion engine including at least one combustion chamber having a main chamber and a prechamber, wherein the prechamber is in fluid connection with the main chamber via at least one bore. The at least one combustion chamber is connected to a charging path for the supply of a combustion air-fuel mixture into the combustion chamber via the charging path. A fuel intermixing region is arranged in a section of the charging path separately assigned to the combustion chamber, which fuel intermixing region is in fluid connection with the charging path on one side and with a fuel line on the other side for the supply of fuel into the fuel intermixing region via a controllable fuel valve. The internal combustion engine wherein the prechamber and the fuel intermixing region are in fluid connection with one another via a check valve.

11 Claims, 3 Drawing Sheets

(51) Int. Cl.
  *F02B 19/12* (2006.01)
  *F02D 19/06* (2006.01)
  *F02D 41/00* (2006.01)

(52) U.S. Cl.
  CPC ......... *F02B 19/12* (2013.01); *F02M 21/0272* (2013.01); *F02M 21/0275* (2013.01); *F02M 21/0278* (2013.01); *F02D 19/0647* (2013.01); *F02D 41/0027* (2013.01); *F02M 21/0215* (2013.01); *Y02T 10/125* (2013.01); *Y02T 10/142* (2013.01); *Y02T 10/32* (2013.01); *Y02T 10/36* (2013.01)

(58) Field of Classification Search
  USPC ................ 123/261, 267, 275, 277, 278, 527
  See application file for complete search history.

(56) References Cited

U.S. PATENT DOCUMENTS

| | | | | |
|---|---|---|---|---|
| 5,024,193 | A * | 6/1991 | Graze, Jr. | ........... F02D 41/0027 123/259 |
| 8,925,518 | B1 * | 1/2015 | Riley | ...................... F02B 19/10 123/261 |
| 2002/0148451 | A1 | 10/2002 | Yamamoto | |
| 2015/0267631 | A1 | 9/2015 | Miyamoto et al. | |
| 2018/0135505 | A1 * | 5/2018 | Fuchs | ...................... F02B 19/12 |

\* cited by examiner

INTERNAL COMBUSTION ENGINE AND METHOD FOR OPERATING AN INTERNAL COMBUSTION ENGINE

The present application is a 371 of International application PCT/EP2016/000494, filed Mar. 22, 2016, which claims priority of DE 10 2015 206 074.8, filed Apr. 2, 2015, the priority of these applications is hereby claimed and these applications are incorporated herein by reference.

BACKGROUND OF THE INVENTION

The invention concerns an internal combustion engine and a method for operating an internal combustion engine.

In the case of internal combustion engines that are operated with so-called multi-point injection (MPI), the ignition behavior is typically coupled to a residual gas content in a combustion chamber of the internal combustion engine and a global combustion air-fuel ratio, which is also referred to as the lambda value. In this case, regions that are located in the immediate vicinity around an ignition source are seen as particularly critical. In order to be able to ignite even very weak mixtures in the combustion chamber, said combustion chamber is typically divided into a main chamber and a prechamber, wherein reliable ignition can be guaranteed in the smaller prechamber volume, and wherein flares passing from the prechamber to the main chamber can guarantee reliable ignition of the mixture even in the larger volume of the main chamber. In the case of prechambers flushed with gas that are directly connected to a combustion gas supply, additional components must be provided, for example an additional gas compressor, a gas cooler, and a combustion gas supply for each combustion chamber. It is also possible that a prechamber that is flushed with gas is coupled to a high-pressure side of a multi-point injection system, wherein the coupling is therefore connected upstream of an actuatable valve for multi-point injection. Thus, however, the amount of fuel flushed in the prechamber depends on the supply pressure in the fuel line upstream of the actuatable valve of the multi-point injection system.

SUMMARY OF THE INVENTION

It is the object of the invention to provide an internal combustion engine and a method for operating an internal combustion engine, wherein the aforementioned disadvantages do not occur.

The object is in particular achieved by providing an internal combustion engine that comprises at least one combustion chamber that is connected to a charging path for delivering a combustion air-fuel mixture through the charging path into the combustion chamber, wherein a fuel mixing area, preferably a fuel mixing chamber, is disposed in a segment of the charging path that is separately associated with the combustion chamber. The fuel mixing area has a fluidic connection to the charging path on the one hand and to a fuel line on the other hand, wherein the fuel line is designed for delivering fuel into the fuel mixing area via an actuatable valve. The combustion chamber comprises a main chamber and a prechamber, wherein the prechamber is fluidically connected via at least one bore to the main chamber. The internal combustion engine is thus characterized by the fact that the prechamber and the fuel mixing area are fluidically connected to each other via a non-return valve. The fact that the fuel mixing area is disposed in a segment of the charging path that is separately associated with the combustion chamber, means in particular that it is disposed downstream of a branching point at which the charging path separates into induction pipe segments leading to different combustion chambers if the internal combustion engine comprises more than one combustion chamber. This preferably means that the internal combustion engine is designed to operate with multi-point injection (MPI), wherein in the case in which the internal combustion engine comprises a number of combustion chambers, an amount of fuel can be dispensed into the segment of the charging path that is separately associated with the combustion chamber separately and specifically for each combustion chamber. The fuel mixing area has a fluidic connection to the fuel line via an actuatable fuel valve, so that it is disposed in particular downstream of the actuatable valve. Thus, the fuel mixing area is disposed on a low-pressure side of the device for multi-point injection, i.e. downstream of the actuatable valve. As a result of the fact that the prechamber is fluidically connected to the fuel mixing area via the non-return valve, it is not fluidically connected to a high-pressure area of the device for multi-point injection, but rather to a low-pressure area downstream of the actuatable valve. The internal combustion engine has advantages compared to the prior art. In particular, the flushed fuel quantity is independent of the supply pressure on the high-pressure side of the multi-point injection device, in particular the supply pressure in the fuel line on the high-pressure side. Rather, the flushed amount depends directly on a pressure difference between the pressure in the fuel mixing area on the one hand and the current pressure in the prechamber on the other hand. I.e. the non-return valve can open or close depending on said pressure conditions, wherein in particular automatic flushing of the prechamber depending on the currently prevailing pressure conditions is possible. In this case there is no need for additional components, in particular no additional gas compressor, gas cooler or an additional gas supply for the prechamber, since the same is directly supplied with fuel from the fuel mixing area. It is thus possible to implement the behavior of a gas-flushed prechamber using a simple non-return valve.

The term "non-return valve" shall in particular mean here and below a valve device that can be moved to an open or closed position depending on a pressure drop across the valve device. The valve device thus opens and closes depending on the pressure conditions upstream of the valve device on the one hand and downstream on the other hand. In the case of a particularly simple and inexpensive design of the non-return valve, it is provided that a valve element or valve body is displaced against a valve seat under a preload, wherein in this case the valve device opens if a pressure difference across said valve device exceeds the preload force acting on the valve element or the valve body in the opening direction.

The fuel mixing area is preferably implemented as a fuel mixing chamber. Said chamber comprises in particular a chamber wall that protrudes at least in some areas into the segment that is separately associated with the charging path, wherein the wall of the fuel mixing chamber is preferably penetrated by at least one connecting bore, through which the separately associated segment of the charging path is fluidically connected to the fuel mixing chamber.

The internal combustion engine proposed here combines in an inexpensive manner the advantages of multi-point injection with a gas-flushed prechamber and thus enables in particular the use of a flushed prechamber even in areas in which this has not been customary to date, in particular in the region of marine applications, applications of the internal combustion engine for driving railway vehicles, applications in the construction and industrial fields, applications for extracting raw materials, in particular for extracting oil and/or gas, and numerous other applications. In this case, it is proving advantageous in particular in safety-sensitive fields, for example in the marine field, that combustible mixture no longer has to be fed around the engine in the case of the internal combustion engine proposed here. Furthermore, the engine can be operated leaner using the flushed prechamber. This in turn causes an increase in a permissible spread of a lambda value, i.e. of a combustion air-fuel ratio, which ultimately results in an improved design load and in particular in improved transient behavior of the internal combustion engine. By the weakening of the mixture at stationary cycle points, oxides of nitrogen emissions of the internal combustion engine can also be reduced. The efficiency of the engine is increased by the ignition-boosted effect of the prechamber. Moreover, the internal combustion engine comprises improved ignition behavior, so that in particular misfiring during idling can be effectively avoided.

An exemplary embodiment of the internal combustion engine is preferred that is characterized in that a connecting path is provided that opens in the fuel mixing area at a first end of two ends of the connecting path, wherein it opens in the prechamber at a second end of the two ends. The non-return valve is disposed in the connecting path. The connecting path is thus a particularly simple implementation of a fluidic connection between the fuel mixing area and the prechamber. It is possible that the connecting path is implemented as a line, in particular as a pipeline or as a hose. The connecting path can also be implemented at least in some areas or even fully as a channel and in particular at least in some areas as a bore, wherein this can be implemented at least partly in a cylinder head of the internal combustion engine. Furthermore, it is possible that the connecting path is integrated in a wall of the prechamber at least in some areas. Particularly preferably, it is possible that the non-return valve is integrated within a wall of the prechamber and/or within a cylinder head of the internal combustion engine. This likewise enables the simple and inexpensive manufacture of the internal combustion engine.

The connecting path preferably comprises exactly two ends, i.e. the first end and the second end, wherein the two ends are provided opposite each other on the connecting path. Combustion gas thus flows in particular along the connecting path from the first end to the second end. The non-return valve is in particular disposed between the first end and the second end of the connecting path.

The non-return valve is preferably preloaded into a closed position, wherein it is in particular oriented in the connecting path such that a pressure prevailing in the region of the first end of the connecting path, i.e. upstream of the non-return valve, tends to force the non-return valve from the closed position thereof into an open position, wherein conversely a pressure prevailing in the region of the second end of the connecting path tends to force the non-return valve into the closed position thereof in addition to the preload force. The non-return valve therefore preferably opens if the pressure in the prechamber is less than the pressure in the fuel mixing area, wherein a pressure difference between the pressure in the fuel mixing area and the pressure in the prechamber must in particular be greater than a specified pressure difference limit, which is in particular determined by the preload of the non-return valve.

This shows that the pressure in the fuel mixing area preferably at least essentially corresponds to a charging pressure, because the fuel mixing area is fluidically connected—preferably via at least one bore—to the charging path. By contrast, the pressure in the prechamber essentially depends on the combustion chamber pressure and is thus in particular a function of the crankshaft angle of the internal combustion engine, wherein it varies periodically with the movement of a piston in the combustion chamber in the case of an internal combustion engine implemented as a reciprocating engine. Furthermore, the pressure difference is in particular also dependent on a position of an inlet valve and/or on an exhaust valve, wherein the inlet valve connects the main chamber of the combustion chamber to the charging path, wherein the exhaust valve connects the main chamber of the combustion chamber to an exhaust path.

An exemplary embodiment of the internal combustion engine is preferred that is characterized in that the combustion chamber is fluidically connected to the charging path via at least one inlet valve. In this case, in particular control times for the inlet valve determine a profile of the pressure difference and thereby a flushing behavior of the prechamber. It is possible to achieve optimal flushing of the prechamber by setting the control times for the inlet valve. Particularly preferably, the combustion chamber is fluidically connected to the charging path via at least one variably actuatable inlet valve, in particular via an inlet valve with a fully variable valve drive. Thus, it is possible, in particular depending on the operating point, to vary the control times of the inlet valve and thus to achieve optimal flushing of the prechamber by means of the pressure difference at any time and in particular at any operating point of the internal combustion engine.

In the case of a particularly preferred exemplary embodiment, the combustion chamber is fluidically connected to the charging path via two inlet valves, in particular via two variably actuatable inlet valves.

An exemplary embodiment of the internal combustion engine is also preferred that is characterized in that the actuatable fuel valve is implemented as a dispensing valve for multi-point injection. In this case, the aforementioned advantages are realized.

An exemplary embodiment of the internal combustion engine is also preferred that is characterized in that the fuel line, which is provided for delivering fuel into the fuel mixing area via the actuatable fuel valve, opens in the connecting path. This constitutes a particularly simple and inexpensively manufacture design of the internal combustion engine, since the connecting path can be used with two functions as it were. On the one hand, it is used in some areas for delivering just fuel from the fuel line into the fuel mixing area, in particular via the first end thereof that opens into the fuel mixing area, on the other hand it is used—as already described—for the fluidic connection between the fuel mixing area and the prechamber. It is in particular provided that the fuel line downstream of the actuatable fuel valve opens into the connecting path. The connecting path is not connected to the high-pressure area of the fuel line disposed upstream of the actuatable fuel valve, but to the low-pressure area disposed downstream of the actuatable valve. Thus, it is in particular disposed on the low-pressure side of the device for multi-point injection. This enables the fuel line downstream of the actuatable fuel valve—i.e. on the low-pressure side—to be connected to the connecting path easily and without additional measures. In particular, an opening into the fuel mixing area can be dispensed with, so that corresponding manufacturing steps and hence associated manufacturing costs are eliminated. Rather, the first end of the connecting path is used both for delivering fuel into the fuel mixing area and for delivering fuel or a rich combustion air-fuel mixture from the fuel mixing area into the prechamber via the connecting path and the non-return valve.

The internal combustion engine is preferably implemented as a reciprocating piston engine. In the case of a preferred exemplary embodiment, the internal combustion engine is used to drive in particular heavy land vehicles or water-borne vehicles, for example mining vehicles and trains, wherein the internal combustion engine is used in a locomotive or a powered railcar, or ships. The use of the internal combustion engine for driving a defense vehicle, for example a tank, is also possible. An exemplary embodiment of the internal combustion engine is preferably also used statically, for example for static power supply for emergency power operation, continuous load operation or peak load operation, wherein in this case the internal combustion engine preferably drives a generator. Static application of the internal combustion engine for driving auxiliary units, for example fire extinguisher pumps on oil rigs, is possible. Furthermore, the use of the internal combustion engine in the field of delivering raw fossil materials and in particular fuels, for example oil and/or gas, is possible. The use of the internal combustion engine in the industrial field or in the construction field, for example in a construction machine or building machine, for example in a crane or an excavator, is possible. The internal combustion engine is preferably implemented as a gasoline engine, as a gas engine to operate with natural gas, biogas, special gas or another suitable gas, or as a two-fuel engine to operate with two different fuels, in particular as a dual-fuel engine or as a bi-fuel engine. In particular, if the internal combustion engine is implemented as a gas engine, it is suitable for use in a combined heat and power plant for static power generation.

More particularly, an exemplary embodiment of the internal combustion engine is preferred that is implemented as a gas engine, in particular as a lean burn gas engine. In this case, the advantages of the flushed prechamber for reliable ignition of an also very lean mixture in the main chamber of the combustion chamber are realized in a particular way.

The object is also achieved by providing a method for operating an internal combustion engine, with which a combustion air-fuel mixture is delivered via a charging path to at least one combustion chamber, which is divided into a main chamber and a prechamber, in an induction stroke, wherein the combustion air-fuel mixture is produced in a segment of the charging path that is separately associated with the combustion chamber, whereby fuel—particularly preferably pure fuel—is delivered through a fuel line via an actuatable fuel valve to a fuel mixing area—in particular a fuel mixing chamber—that is disposed in the separate segment, wherein fuel is fed from the fuel mixing area directly into the prechamber if the pressure in the prechamber is less than the pressure in the fuel mixing area. In this case, in particular the advantages that have already been described in connection with the internal combustion engine are realized in connection with the method.

That the fuel is fed from the fuel mixing area directly into the prechamber means in particular that the fuel from the fuel mixing area is fed via the charging path into the prechamber without a diversion. Rather, the fuel is fed directly into the prechamber via a connecting path that is disposed between the fuel mixing area and the prechamber depending on the pressure in the prechamber on the one hand and the pressure in the fuel mixing area on the other hand.

As the fuel mixing area is fluidically connected to the charging path, it is possible that combustion air also partially passes into the fuel mixing area. It is thus possible that a combustion air-fuel mixture forms therein—but a rich mixture compared to the charging path of the main chamber. In this case, said combustion air-fuel mixture is delivered directly to the prechamber from the fuel mixing area.

The pressure in the fuel mixing area preferably corresponds to the charging pressure in the charging path—apart from any flow-related pressure differences due to a bore between the fuel mixing area, in particular the fuel mixing chamber, and the charging path. The pressure in the prechamber is by contrast—as already described—in particular a function of the crankshaft angle of the internal combustion engine.

An embodiment of the method is preferred that is characterized in that fuel or possibly a combustion air-fuel mixture is fed directly from the fuel mixing area into the prechamber if there is a pressure difference between the pressure in the fuel mixing area and the pressure in the prechamber that exceeds a specified value. In this case, the specified value—in particular a pressure difference limit—is preferably determined by the preload of a non-return valve, which is disposed in the connecting path between the fuel mixing area and the prechamber.

An embodiment of the method is preferred that is characterized in that an inlet valve, which connects the main chamber of the combustion chamber to the charging path, is actuated by Miller control timing. This means in particular that the inlet valve is either closed before reaching the bottom dead center of the piston that can be displaced in the combustion chamber in an induction stroke, or that the inlet valve is closed so early in any case that the pressure in the combustion chamber remains below a level of the charging pressure owing to gas-dynamic effects even after closure of the inlet valve while still in a defined range of crankshaft angles, before it rises above the charging pressure owing to compression. Because of the effective gas dynamics, it is possible that this is still the case if the inlet valve closes exactly on reaching the bottom dead center point of the piston. This is due to the inertia of the gas flow in the charging path on the one hand and in the combustion chamber on the other hand. Therefore, closing the inlet valve on reaching the bottom dead center point still also counts as Miller control timing. The actuation of the inlet valve, in particular of an inlet valve with a fully variable valve drive, with Miller control timing enables the formation of a pressure difference between the fuel mixing area and the prechamber, which enables particularly efficient flushing of the prechamber with pure fuel, in particular combustion gas, or a rich mixture from the fuel mixing area.

Finally, an embodiment of the method is preferred that is characterized in that the internal combustion engine is operated with gas. The internal combustion engine is preferably operated with a gas containing methane as the fuel, in particular natural gas, landfill gas, biogas, special gas, product gas from wood gasification, or another suitable gas. In particular, such internal combustion engines are often operated with a very lean fuel-combustion air mixture, wherein the advantages of the method are realized in a particular way.

It appears that the behavior of a gas-flushed prechamber using a simple non-return valve can be realized by the internal combustion engine and the method. For this purpose, pure combustion gas or a rich mixture is fed into the prechamber downstream of a multi-point injection valve, i.e. of the actuatable fuel valve, through the connecting path in which the non-return valve is arranged. If Miller control timing is carried out for the at least one inlet valve, a particularly effective pressure difference arises between the fuel mixing area on the one hand and the prechamber on the other hand. Consequently, the non-return valve opens and the prechamber is flushed with pure combustion gas or a rich mixture from the fuel mixing area.

The descriptions of the internal combustion engine on the one hand and of the method on the other hand are to be seen as mutually complementary. Features of the internal combustion engine that have been explicitly or implicitly described in connection with the method are preferably individual or combined features of a preferred exemplary embodiment of the internal combustion engine. Steps of the method that have been explicitly or implicitly described in connection with the internal combustion engine are preferably individual or combined steps of a preferred embodiment of the method. This is preferably characterized by at least one step of the method that is due to at least one feature of the internal combustion engine. The internal combustion engine is preferably characterized by at least one feature that is due to at least one step of a preferred embodiment of the method.

BRIEF DESCRIPTION OF THE DRAWING

The invention is described in detail below using the drawing. In the figures.

DETAILED DESCRIPTION OF THE INVENTION

Figure 1:
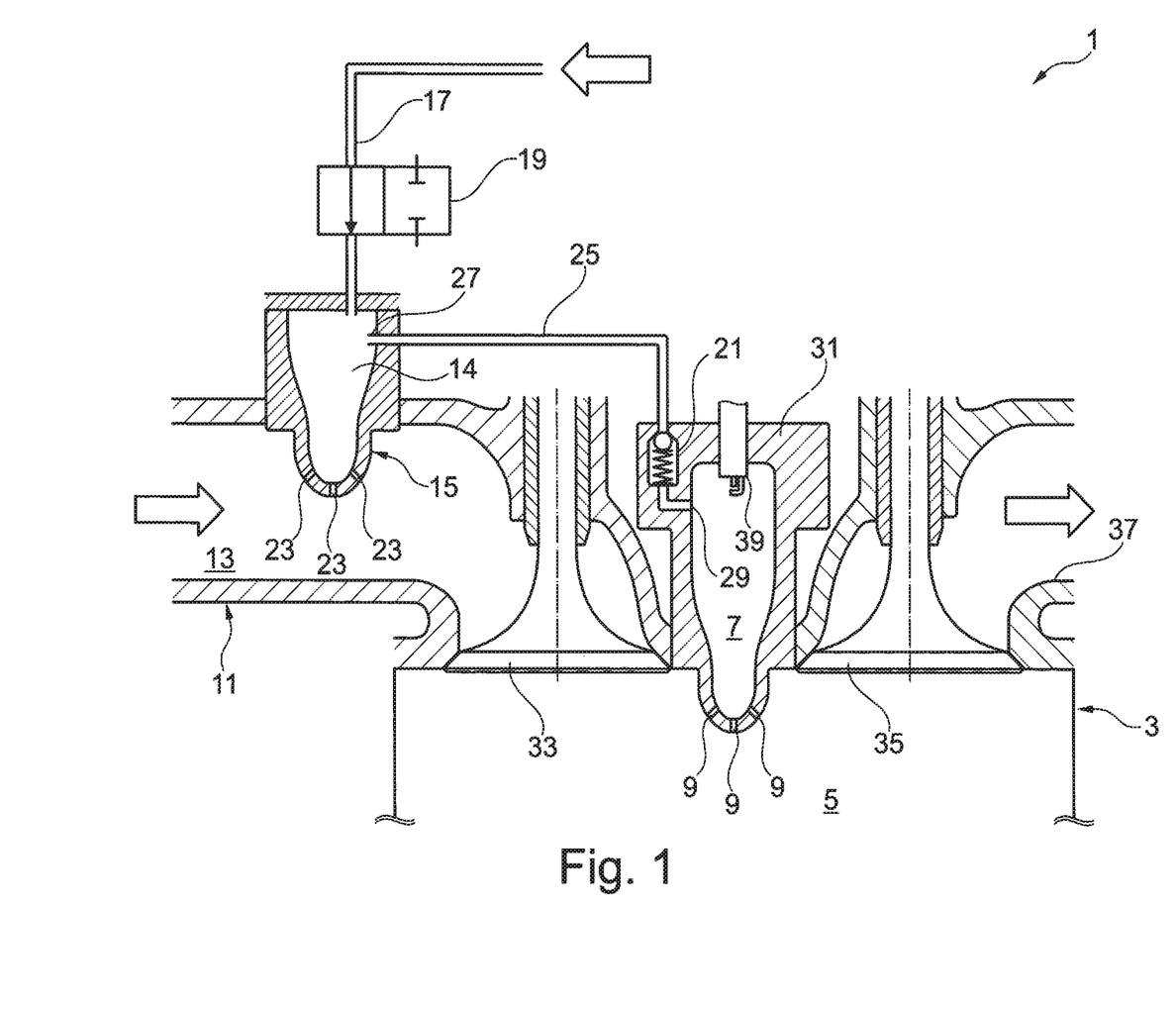
FIG. 1 shows a schematic representation of a first exemplary embodiment of an internal combustion engine.

FIG. 1 shows a schematic representation of an exemplary embodiment of an internal combustion engine 1. This comprises a combustion chamber 3 that is divided into a main chamber 5 and a prechamber 7. In this case, the main chamber and the prechamber 7 are fluidically connected to each other via bores 9. The prechamber 7 is used here for reliable ignition of a richer combustion air-fuel mixture in the comparatively small chamber volume, wherein flares enter the main chamber 5 via the bores 9 if the mixture in the prechamber 7 is ignited, wherein a leaner combustion air-combustion gas mixture present in the main chamber 5 is reliably and fully ignited by the flares. This in particular enables very lean combustion air-fuel mixtures to be ignited, even in the case of large volume main chambers 5.

The combustion chamber 3, in particular the main chamber 5, is fluidically connected to a charging path 11, wherein the charging path 11 is designed for delivering a combustion air-fuel mixture through the charging path 11 into the combustion chamber 3, in particular into the main chamber 5.

In a segment 13 of the charging path 11 that is separately associated with the combustion chamber 3, a fuel mixing area 14, here a fuel mixing chamber 15, is disposed, which on the one hand is fluidically connected to the charging path 11 and on the other hand is fluidically connected to a fuel line 17, wherein the fuel line 17 is designed for delivering in particular pure fuel into the fuel mixing area 14 via an actuatable fuel valve 19.

The prechamber 7 is fluidically connected to the fuel mixing chamber 15 via a non-return valve 21 for flushing the prechamber 7 with pure fuel or with a rich combustion air-fuel mixture. It is thus possible to realize a prechamber that is flushed with gas 7 in a very simple way. In particular, no additional components are required for this, very particularly no separate gas compressor, gas cooler and/or separate gas supply for the prechamber 7. Furthermore, the flushing behavior of the prechamber is not dependent on a supply pressure in the fuel line 17 upstream of the actuatable fuel valve 19.

The internal combustion engine 1 is preferably implemented as a reciprocating piston engine, wherein a piston that is not represented in FIG. 1 is displaceably accommodated in the main chamber 5 of the combustion chamber 3. The internal combustion engine 1 preferably comprises a number of combustion chambers 3, in particular four cylinders, six cylinders, eight cylinders, ten cylinders, twelve cylinders, sixteen cylinders, eighteen cylinders, twenty cylinders or twenty-four cylinders. A smaller, larger or different number of cylinders is also possible. Furthermore, it is possible that the internal combustion engine 1 is implemented as an in-line engine, as a V-engine, as a W-engine, or with another configuration of the combustion chambers 3.

In particular, multi-point injection is provided for the internal combustion engine 1, wherein the actuatable fuel valve 19 is preferably implemented as a dispensing valve for multi-point injection (MPI). This means that the dispensing of fuel into the separate segment 13 of the charging path 11 associated with the combustion chamber 3 is carried out downstream of a branching point of a common charging path in separate induction pipe segments to the individual cylinders and hence cylinder-specifically. Thus, a specifically set mass of fuel can be delivered to each cylinder by cylinder-specific actuation of the actuatable fuel valves 19 associated with the cylinders.

The fuel mixing chamber 15 is fluidically connected to the charging path 11 and in particular the segment 13 via a number of admixing bores 23. This enables charging air to pass from the charging path 11 through the admixing bores 23 into the fuel mixing chamber 15, so that said chamber contains pure fuel, or in any case a very rich fuel-combustion air mixture. In this case, during flushing of the prechamber 7 said rich mixture passes via the non-return valve 21 into the prechamber 7.

A connecting path 25 is provided that opens at a first end of two ends in the fuel mixing chamber 15, wherein it opens at a second end 29 of the two ends 27, 29 in the prechamber 7. The non-return valve 21 is disposed in the connecting path 25. This shows that here the connecting path 25 is partly integrated within a wall 31 of the prechamber 7. In this case, in particular the non-return valve 21 is integrated within the wall 31.

It also appears that the non-return valve 21 is preloaded in a closed position, wherein it is disposed in the connecting path 25 between the first end 27 and the second end 29 such that a pressure upstream of the non-return valve 21 on the side of the first end 27 in the connecting path 25 tends to force the non-return valve 21 from the closed position thereof into an open position, wherein a pressure downstream of the non-return valve 21 on the side of the second end 29 in the connecting path 25 acts on the non-return valve 21 in addition to the preload force in the closed position thereof.

The non-return valve 21 opens if the pressure in the prechamber 7 is less than the pressure in the fuel mixing chamber 15, in particular if a pressure difference between the pressure in the fuel mixing chamber 15 and the pressure in the prechamber 7 exceeds a specified pressure difference limit, which is in particular determined by the geometric design of the effective area of the non-return valve 21 and the preload thereon in the closed position thereof. Therefore, the flushing behavior of the prechamber 7 can be adjusted or matched in particular by the geometric design of the non-return valve 21 and setting the preload thereof.

The combustion chamber 3, in particular the main chamber 5, is fluidically connected to the charging path 11 via an inlet valve 33. The inlet valve 33 preferably comprises a fully variable valve drive that is not represented in FIG. 1, so that control times for the inlet valve 33 can be varied, in particular depending on the operating point. The combustion chamber 3, in particular the main chamber 5, is moreover fluidically connected to an exhaust path 37 via an exhaust valve 35. In particular, by actuation of the inlet valve 33, but preferably also by actuation of the exhaust valve 35, it is possible to influence the pressure conditions in the combustion chamber 3, in particular in relation to the pressure in the charging path 11, and thus to influence the flushing behavior of the prechamber 7—in particular depending on the operating point.

The internal combustion engine 1 is preferably implemented as a gas engine, in particular as a lean burn gas engine. In this case, a combustion gas, preferably a combustion gas containing methane, is used as the fuel.

It also shows that an ignition device 39 for the ignition of the combustion air-fuel mixture is disposed in the prechamber 7. This can for example be an electrical spark ignition plug, a corona ignition plug, a laser ignition plug or another suitable ignition plug or ignition device.

Figure 2:
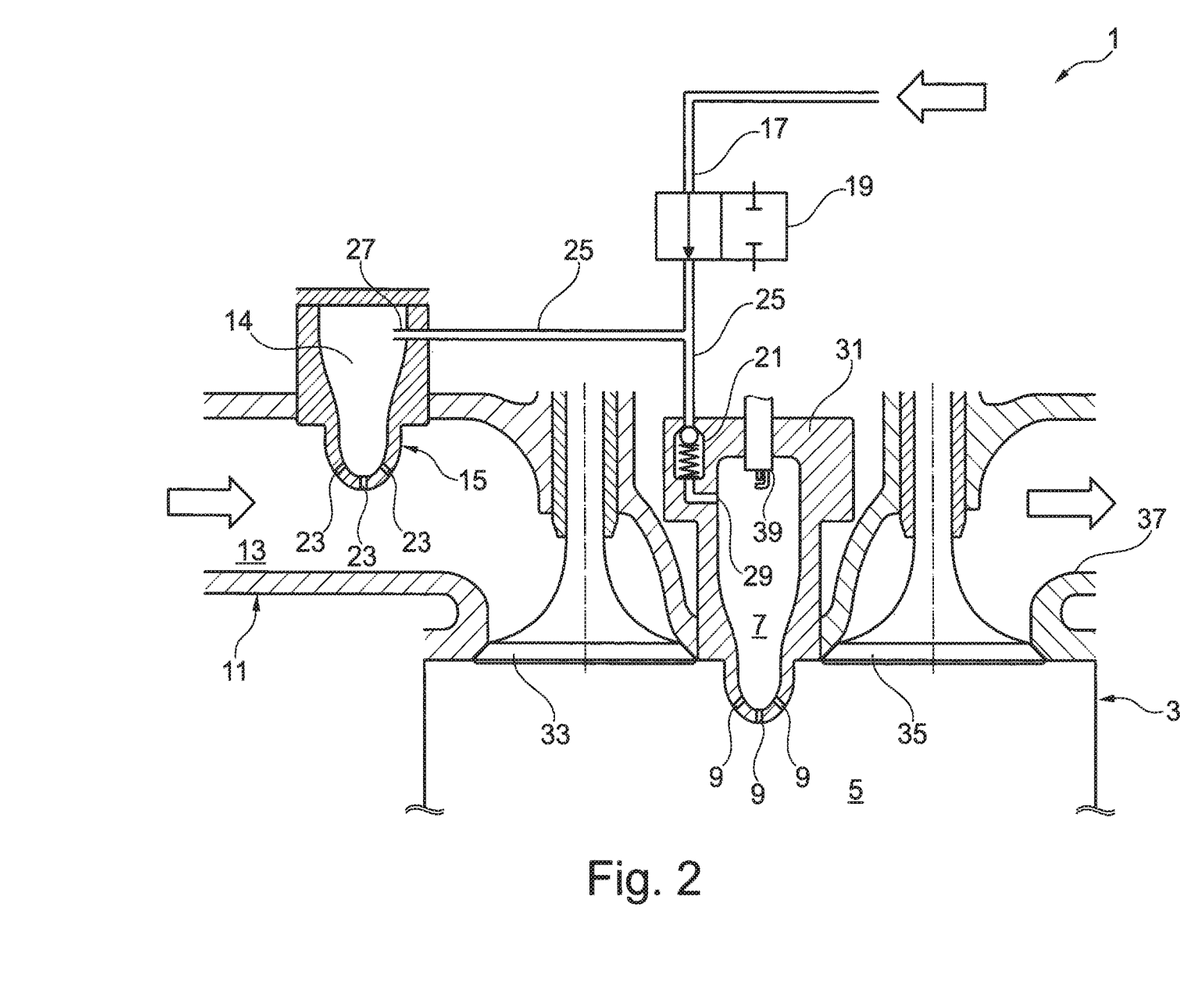
FIG. 2 shows a schematic representation of a second exemplary embodiment of an internal combustion engine.

FIG. 2 shows a schematic representation of a second exemplary embodiment of an internal combustion engine 1. Identical and functionally equivalent elements are provided with the same reference characters, so that in this respect reference is made to the preceding description. With said exemplary embodiment, it is in particular provided that the fuel line 17 opens in the connecting path 25 downstream of the actuatable fuel valve 19, rather than on the low-pressure side of the device for multi-point injection. This is a particularly simple design of the internal combustion engine 1, since in this way the connecting path 25 can have two functions at least in some areas, i.e. on the one hand the delivery of pure fuel into the fuel mixing area 14 via the fuel line 17 and finally the first end 27, and on the other hand the delivery of pure fuel or a rich combustion fuel-air mixture from the fuel mixing area 14 via the connecting path 25 and the non-return valve 21 into the prechamber 7, as already described. In this case, only one bore or opening—apart from the admixing bores 23—is required, i.e. from the first end 27 of the connecting path 25, through which on the one hand pure fuel can be delivered to the fuel mixing area 14, and through which on the other hand pure fuel or a pure combustion air-fuel mixture can flow from the fuel mixing area 14 into the prechamber 7. This simplifies the design of the fuel admixing area 14 and in particular the fuel mixing chamber 15, wherein in particular production or manufacturing steps for introducing a further bore or for providing a further line can be eliminated.

Figure 3:
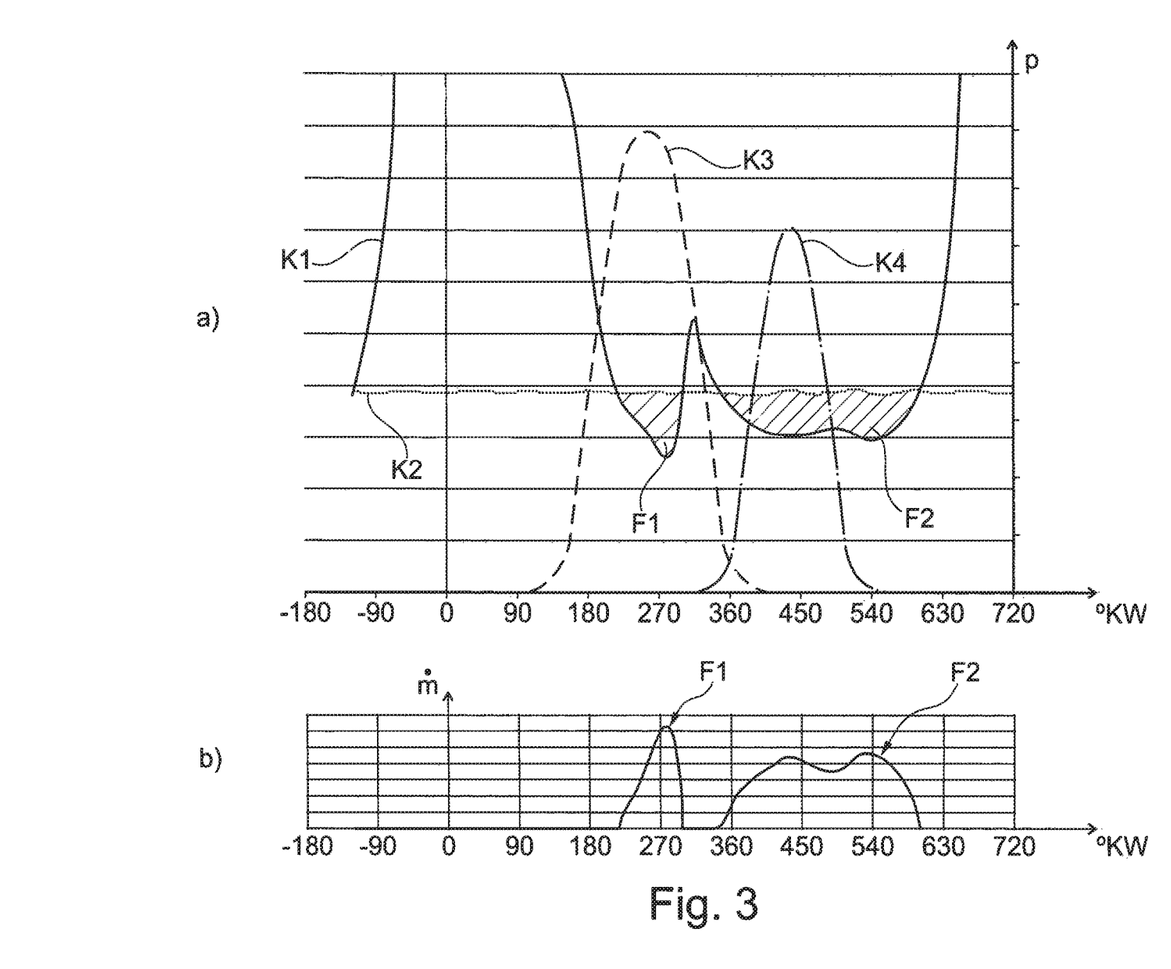
FIG. 3 shows a schematic, diagrammatic representation of an embodiment of the method.

FIG. 3 shows a schematic, diagrammatic representation of an embodiment of the method. In this case, FIG. 3a) shows a plot of a pressure p against a crankshaft angle of a crankshaft of the internal combustion engine 1 in degrees of crankshaft angle (° KW). The pressure profile in the combustion chamber 3, in particular in the main chamber 5, is represented here as a solid first curve K1, wherein the pressure in the main chamber 5 essentially corresponds to the pressure in the prechamber 7. A charging pressure prevailing in the charging path 11 and in particular in the segment 13 separately associated with the combustion chamber is represented as a second dotted curve K2. This shows that the charging pressure is essentially constant and in particular varies only slightly depending on the current crankshaft angle of the internal combustion engine 1. A control curve for the exhaust valve 35 is represented as a third dashed curve K3. A control curve for the inlet valve 33 is represented as a fourth dot-dash curve K4.

Considering the first solid curve K1 of the cylinder pressure, it shows that during an expansion stroke of the cylinder, and in particular at the point in time at which the exhaust valve 35 opens, the cylinder pressure decreases until it finally falls below the level of the charging pressure of the second curve K2 that is shown dotted. If the exhaust valve 35 is closed again, the pressure rises again, in particular above the level of the charging pressure. A first dashed area F1 shows an area in a region between the first solid curve K1 of the cylinder pressure and the second dotted curve K2 of the charging pressure, in which the cylinder pressure is less than the charging pressure. A positive flushing gradient thus prevails here, wherein a first flushing process occurs thereby. The non-return valve 21 thus opens, and fuel or a pure mixture passes from the fuel mixing chamber 15 into the prechamber 7. However, the mass of fuel in the first area F1 flushed in the prechamber 7 is small in comparison to the total flushed mass, so that there is preferably no overflow into the main chamber 5 here.

The first area F1 can also be eliminated. In particular, it is possible to select at least one parameter selected from a group consisting of an exhaust counter pressure, a geometric design of the effective area of the non-return valve 21, the preload thereof, and actuation of the inlet valve 33 and/or of the exhaust valve 35, or a number of the aforementioned parameters and/or other or additional parameters such that the cylinder pressure in the range of crankshaft angles of the first area F1 represented in FIG. 3a) does not fall below the level of the charging pressure, or in any case only to such an extent that the non-return valve 21 does not open. Such a design can have advantages. In particular, it can thus be prevented that unburnt fuel flows through the opened exhaust valve 35, whereby possibly hydrocarbon emissions of the internal combustion engine 1 could be increased—possibly in an unacceptable way. Furthermore, owing to the still relatively hot combustion chamber in the range of crankshaft angles of the first area F1 represented in FIG. 3a), there is a risk of self-ignition of the introduced fuel, which can be prevented by avoiding the formation of said area F1.

As is shown using the dashed control curve K3 of the exhaust valve 35 and the dot-dash control curve K4 of the inlet valve 33, the inlet valve 33 is already opening, whereas the exhaust valve 35 is still engaged in the closing movement thereof, there is thus an overlap between the opening of the exhaust valve 35 and of the inlet valve 33. The piston reaches a top dead center point at 360° KW, wherein an induction stroke of the piston, i.e. a downwards movement in the combustion chamber 3, follows this at larger crankshaft angles. Therefore, the pressure in the combustion chamber 3 now reduces again below the charging pressure of the second curve K2 that is shown dotted, as indicated by a second dashed area F2. The dot-dash control curve of the inlet valve 33 shows that said valve closes at 540° KW, i.e. if the piston reaches the bottom dead center point thereof. This corresponds to Miller control timing, wherein owing to the inertia of the gas flow, a pressure difference in the sense of a positive flushing gradient continues between the charging pressure in the fuel mixing chamber 15 and the pressure in the combustion chamber 3, so that the flushing process continues beyond the closing of the inlet valve 33. A certain compression is required by upwards movement of the piston until the pressure in the combustion chamber 3 and also in the prechamber 7 again rises above the level of the charging pressure and hence above the level of the pressure in the fuel mixing chamber 15, wherein the flushing process ends on the right in the diagram at the last intercept point of the solid curve K1 of the cylinder pressure with the dotted curve K2 of the charging pressure. During the opening of the inlet valve 33 and further after the closure thereof, a dominant fuel-flushing process takes place, and thus the greater part of the fuel or rich mixture is introduced into the prechamber 7. During this, the non-return valve 21 always closes if the pressure in the prechamber 7, i.e. in particular the cylinder pressure, exceeds the charging pressure and thereby the pressure in the fuel mixing chamber 15.

FIG. 3b) shows a mass flow ṁ plotted against the crankshaft angle. In this case, the first flushing process can be seen in the region of the first area F1 represented in FIG. 3a), and the second flushing process in the region of the second area F2 represented in FIG. 3a). This also shows that the greater part of the fuel is introduced into the prechamber 7 during the second flushing process. In this case, the flushing is carried out in particular owing to the pressure loss in the inlet elements, wherein the pressure in the cylinder lies below the charging pressure level as a result.

In order to realize the method, it is not absolutely necessary that the inlet valve 33 is actuated using Miller control timing. Rather, the method can also be usefully carried out with other control timings. However, Miller control increases the efficiency of the method and improves the flushing of the prechamber 7.

Overall, it is in particular apparent that an implementation of a gas-flushed prechamber 7 using a simple non-return valve 21 is enabled by the internal combustion engine 1 and the method. In this case, a pressure difference between the charging pressure and hence the pressure in the fuel mixing area 14 downstream of an actuatable fuel valve 19 and the pressure in the combustion chamber 3 including the prechamber 7 is used to cause opening of the non-return valve 21 and to flush the prechamber 7 with pure fuel or a rich mixture of combustion air and fuel.

The invention claimed is:

1. An internal combustion engine, comprising:
   at least one combustion chamber having a main chamber and a prechamber, wherein the prechamber is fluidically connected to the main chamber via at least one bore;
   a charging path connected to the at least one combustion chamber for delivering a combustion air-fuel mixture through the charging path into the combustion chamber;
   a fuel mixing chamber disposed in a segment of the charging path and separately associated with the combustion chamber, the fuel mixing chamber being fluidically connected to the charging path and fluidically connected to a fuel line for delivering fuel into the fuel mixing chamber via an actuatable fuel valve; and a non-return valve that fluidically connects the prechamber and the fuel mixing chamber to each other.

2. The internal combustion engine according to claim 1, further comprising a connecting path that opens in the fuel mixing chamber at a first end of two ends and opens in the prechamber at a second end of the two ends, wherein the non-return valve is disposed in the connecting path.

3. The internal combustion engine according to claim 1, further comprising at least one variably actuatable inlet valve fluidically connects the combustion chamber to the charging path.

4. The internal combustion engine according to claim 1, wherein the actuatable fuel valve is as a dispensing valve for multi-point injection.

5. The internal combustion engine according to claim 2, wherein the fuel line opens in the connecting path.

6. The internal combustion engine according to claim 1, wherein the internal combustion engine is a gas engine.

7. The internal combustion engine according to claim 6, wherein the internal combustion engine is a lean burn gas engine.

8. A method for operating an internal combustion engine, comprising the steps of:
   delivering a combustion air-fuel mixture in an induction stroke to at least one combustion chamber that is divided into a main chamber and a prechamber via a charging path;
   providing the combustion air-fuel mixture in a segment of the charging path that is separately associated with the combustion chamber by delivering fuel into a fuel mixing chamber that is disposed in the separate segment through a fuel line via an actuatable fuel valve; and
   directly diverting fuel from the fuel mixing chamber into the prechamber if pressure in the prechamber is less than pressure in the fuel mixing chamber.

9. The method according to claim 8, including directly feeding fuel from the fuel mixing chamber into the prechamber when a pressure difference between the pressure in the fuel mixing chamber and the pressure in the prechamber exceeds a specified value.

10. The method according to claim 8, including actuating an inlet valve that connects the main chamber to the charging path using Miller control timing.

11. The method according to claim 8, including operating the internal combustion engine with gas as a fuel.

* * * * *